US012662064B1

(12) United States Patent
Brunson et al.

(10) Patent No.: US 12,662,064 B1
(45) Date of Patent: Jun. 23, 2026

(54) FLUSH MOUNT DASH SYSTEM AND METHOD OF INSTALLING THE FLUSH MOUNT DASH SYSTEM

(71) Applicants:Brunson Marine Group LLC, Wilson, NC (US); Fin-Addict Marine, Inc., Benson, NC (US)

(72) Inventors: Robert Brunson, Wilson, NC (US); Brown Towles, Benson, NC (US); Cody McLean, Benson, NC (US)

(73) Assignees: Brunson Marine Group LLC, Wilson, NC (US); Fin-Addict Marine, Inc., Benson, NC (US)

( * ) Notice: Subject to any disclaimer, the term of this patent is extended or adjusted under 35 U.S.C. 154(b) by 17 days.

(21) Appl. No.: 18/795,086

(22) Filed: Aug. 5, 2024

(51) Int. Cl.
*B60R 11/02* (2006.01)
*B63B 49/00* (2006.01)
*B60R 11/00* (2006.01)

(52) U.S. Cl.
CPC .......... *B60R 11/0235* (2013.01); *B63B 49/00* (2013.01); *B60R 2011/0005* (2013.01); *B60R 2011/0043* (2013.01)

(58) Field of Classification Search
CPC ......... B60R 11/0235; B60R 2011/0005; B63B 49/00; B63B 45/06
USPC ....................................................... 248/27.1
See application file for complete search history.

(56) References Cited

U.S. PATENT DOCUMENTS

| | | | |
|---|---|---|---|
| 5,410,373 A | 4/1995 | Sagues et al. | |
| 6,559,829 B1 | 5/2003 | Matsuo et al. | |
| 6,633,276 B1 | 10/2003 | Jaynes | |
| 6,702,356 B2 * | 3/2004 | Kondo ................... | B60K 35/50 |
| | | | 296/70 |
| 7,337,024 B1 | 2/2008 | Graham | |
| 7,337,566 B2 | 3/2008 | Inayoshi | |
| 7,708,233 B2 | 5/2010 | Tannas, Jr. | |
| 9,120,433 B1 | 9/2015 | Thorsell et al. | |
| 9,346,414 B1 | 5/2016 | Kuhens | |
| 9,718,530 B2 * | 8/2017 | Kabel ................... | B63H 25/42 |
| 9,827,736 B2 * | 11/2017 | Suess ................... | B60K 35/425 |
| 10,274,128 B2 * | 4/2019 | Ricci ...................... | F16M 13/02 |
| 10,801,665 B2 * | 10/2020 | Casagrande .......... | F16M 11/14 |
| 11,008,077 B2 * | 5/2021 | Bailey ................. | G01C 21/203 |
| 11,242,120 B1 * | 2/2022 | Ingram, Jr. ............. | B63B 49/00 |
| 12,428,063 B2 * | 9/2025 | Park .................... | B62D 21/155 |
| 2002/0125401 A1 | 9/2002 | Szumita et al. | |
| 2005/0133677 A1 | 6/2005 | Conerton | |

(Continued)

*Primary Examiner* — Todd M Epps

(74) *Attorney, Agent, or Firm* — Hanrahan Law Firm, P.A.; Benjamin M. Hanrahan

(57) ABSTRACT

An adjustable flush mount dash system, and a method of installing the adjustable flush mount dash system is presented herein. The method includes mounting a floating spacer to a mounting frame of a dash unit, disposing the floating spacer and the dash unit into an inset framed opening on a rear surface of a dash panel, and mounting a backing plate to the rear surface of the dash panel, with the floating spacer and the attached dash unit sandwiched and movable between the dash panel and the backing plate. Using a plurality of set screws passing through the backing plate and into engagement with the floating spacer, an axial position of the floating spacer is selected until the flush front surface is obtained. Then, using a plurality of mounting screws, the selected position of the floating spacer, and attached dash unit, is maintained.

12 Claims, 18 Drawing Sheets

(56)             References Cited

U.S. PATENT DOCUMENTS

| | | | |
|---|---|---|---|
| 2006/0060732 | A1 | 3/2006 | Tannas |
| 2007/0267554 | A1 | 11/2007 | Tannas |
| 2009/0184532 | A1 | 7/2009 | Schaupensteiner |
| 2009/0268411 | A1 | 10/2009 | Baker |
| 2010/0213323 | A1 | 8/2010 | Tannas, Jr. |
| 2011/0267759 | A1 | 11/2011 | Abram et al. |
| 2012/0079694 | A1 | 4/2012 | Anders |
| 2014/0210605 | A1 | 7/2014 | Abel et al. |
| 2015/0239572 | A1 | 8/2015 | Tannas, Jr. |
| 2016/0345045 | A1 | 11/2016 | Liu et al. |
| 2018/0216777 | A1 | 8/2018 | Speicher et al. |
| 2018/0236873 | A1 | 8/2018 | Nguyen |
| 2019/0187509 | A1 | 6/2019 | Iemura et al. |
| 2020/0102057 | A1 | 4/2020 | Bailey et al. |
| 2022/0306013 | A1 | 9/2022 | Nakamura et al. |
| 2022/0324471 | A1 | 10/2022 | Matsumoto et al. |
| 2022/0332259 | A1 | 10/2022 | Jordan |

* cited by examiner

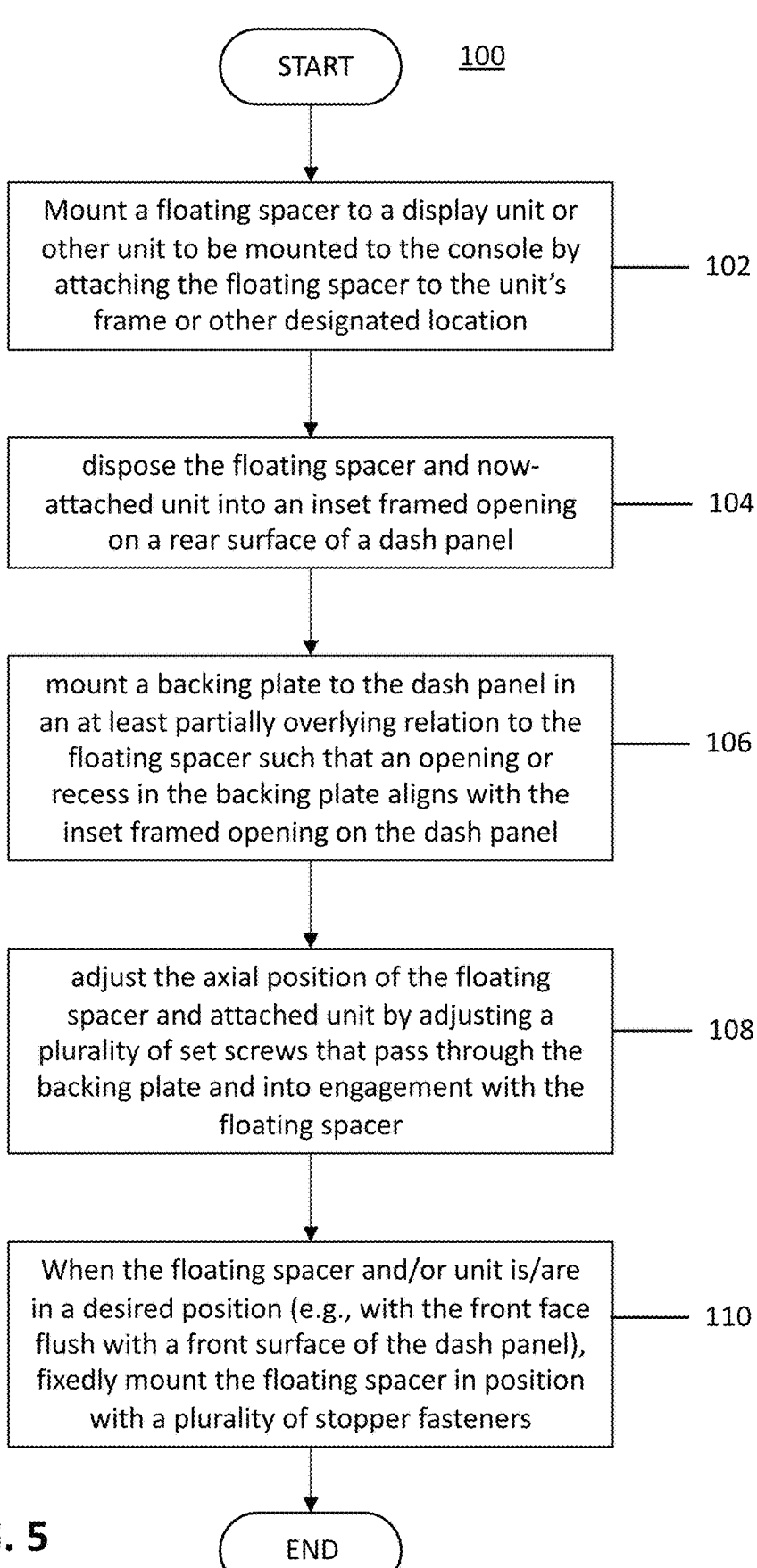

START        100

Mount a floating spacer to a display unit or other unit to be mounted to the console by attaching the floating spacer to the unit's frame or other designated location — 102 dispose the floating spacer and now-attached unit into an inset framed opening on a rear surface of a dash panel — 104 mount a backing plate to the dash panel in an at least partially overlying relation to the floating spacer such that an opening or recess in the backing plate aligns with the inset framed opening on the dash panel — 106 adjust the axial position of the floating spacer and attached unit by adjusting a plurality of set screws that pass through the backing plate and into engagement with the floating spacer — 108

When the floating spacer and/or unit is/are in a desired position (e.g., with the front face flush with a front surface of the dash panel), fixedly mount the floating spacer in position with a plurality of stopper fasteners — 110

END

FIG. 5

START     200 mount a floating spacer to a storage unit or glove compartment to be mounted to the console — 202

Mount the floating spacer and the storage unit door to a backing plate — 204

Mount the storage unit or glove box compartment to the rear surface of the backing plate — 206

Mount the backing plate to the rear surface of the dash panel — 208

END

FLUSH MOUNT DASH SYSTEM AND METHOD OF INSTALLING THE FLUSH MOUNT DASH SYSTEM

FIELD OF THE INVENTION

The present invention is generally directed to a modular reverse flush mount dash system, and a method of installing the flush mount dash system. More specifically, the present invention is directed an adjustable, modular, reverse flush mount dash system and method for marine vessels, or other vehicles, that includes an initially floating spacer that is selectively and manually adjustable to position a mounted dash unit so that it is flush with a front surface of a dash panel.

BACKGROUND OF THE INVENTION

A marine dash panel, dashboard or instrument panel is a control panel often located in a central console of a boat, watercraft or other vessel that includes one or more units that displays instrumentation and controls for the watercraft. For example, in many cases the dash panel or console includes one or more global positioning system (GPS) units, multi-function display units, gauges, stereos, switches, vhf or radio frequency devices or units, etc. In some cases, the dash panel or console may also include a storage box or container, such as a glove box or other like structure that has an interior storage dimension and a door.

Furthermore, marine dash panels are designed to withstand the marine environment and are therefore often resistant to saltwater corrosion and UV damage. In many instances, it is desirable, e.g., aesthetically and functionally, to mount the unit(s) (e.g., display unit, multi-function display unit, GPS unit, gauges, switches, etc.) in a manner such that the front panel of the unit is flush (e.g., even or level) with the front surface of the dash panel. Such a task, however, can be challenging due to several factors, such as, material thickness variations in the dash panel itself, dimension variations in the units, etc. For example, the dash panel may be constructed of acrylic or other materials that may slightly vary in thickness due to manufacturing variances, defects, etc. Similarly, while different units or models may, perhaps intuitively, have different shapes, sizes and dimensions, in some cases, even units of the same make/model may exhibit slightly different dimensions, perhaps due to manufacturing variances, etc.

For these, and many other reasons, obtaining a true flush mount of a display unit or other mounted units in a marine dash panel or console can be difficult. Accordingly, there is a need in the art for a novel system and method that allows for customized positioning adjustments that can achieve a true or nearly true flush mount.

SUMMARY OF THE INVENTION

The present invention is generally directed to an adjustable, reverse flush mounting system and method that allows for one or multiple units to be mounted to the same dash panel while at the same time allowing for varying thicknesses of materials (e.g., acrylic, starboard, etc.) and displays. In some embodiments, the same dash panel can be used to mount one, two or more display units, which in other cases, the same dash panel can be used to mount one or more display units and a storage unit, such as a glove compartment or glove box. In any case, the system and method will result in a solid, flush surface with no exposed fasteners, creating a sleek look and theft deterrence.

In addition, the system of at least one embodiment is designed so that the dash panel can be swapped onto an existing boat or other vessel or vehicle using standard mounting locations without additional drilling or cutting.

Furthermore, the system of at least one embodiment allows the unit(s) to be installed onto the dash panel prior to the dash panel being installed on the boat, vessel or vehicle. This allows most of the mounting work to be completed off-site or otherwise away from the boat, vessel or vehicle, and then quickly installed as an assembled system.

For example, in at least one embodiment, the system and method uses two spacers-a floating spacer and a backing plate—that are mounted behind the front of the dash panel. In particular, the floating spacer(s) are first mounted to the unit(s), through one or more screws or other fasteners. Then, the floating spacer—with the unit attached—is sandwiched between the dash panel and the backing plate or backing layer within a combined opening where the floating spacer is able to slightly move, particularly in an axial direction toward and away from the front surface of the dash panel.

Using a plurality of adjustment devices or set screws that pass through the backing plate and engage the floating spacer, a user is able to precisely adjust the axial positioning of the floating spacer and unit within the combined opening until there is a flush or even surface at the front. These set screws can, therefore, accommodate for the varying thicknesses of both the spacers and the dash panel, allowing the system to be created in a production setting.

Once the floating spacer and unit are in a desired axial position (e.g., when the front surfaces of the unit and the dash panel are flush or even), a plurality of stoppers or mounting screws can be used to fix the floating spacer in position. In at least one embodiment, the mounting screws may pass through the backing plate and into the floating spacer, thereby maintaining the floating spacer in place. In this manner, the floating spacer becomes fixed to the backing plate through the plurality of mounting screws, thereby maintaining the floating spacer in its position. Additionally, mounting the floating spacer to the backing plate also causes the backing plate to carry most or in some cases all of the load or weight exhibited by the display or storage unit.

Moreover, if, at any time, the unit changes, e.g., in size, shape or model (e.g., the owner of the boat wants to replace the unit with a new one), the system of at least one embodiment of the present invention allows the new unit to be installed in the same manner with perhaps different adjustments in the set screws. In some cases, a new dash panel may need to be created (e.g., to accommodate a differently sized unit), which can be accomplished in a separate design program or method. In particular, using three dimensional drawings (e.g., 3D CAD drawings) and a computer numerical control CNC machine, a user is able to easily create a custom dash panel, backing plate and floating spacer(s) to accommodate the particular install. In this manner, the spacers and the dash panel can be easily customized for any unit(s) chosen by the particular owner or user. This allows a significant amount of the installation work and design to occur offsite and away from the boat.

It should be noted that while many embodiments disclosed herein describe the system and method used in a marine environment, e.g., for a boat, watercraft, or other marine vessel, other embodiments may be implemented for other vehicles, including but in no way limited to cars, trucks, all-terrain vehicles, golf carts, motorcycles or other automobiles, aircrafts, airplanes, etc.

BRIEF DESCRIPTION OF DRAWINGS

FIG. 5 is a high-level flow chart of the method as disclosed in accordance with at least one embodiment of the present invention.

Like reference numerals refer to like parts throughout the several views of the drawings provided herein.

DETAILED DESCRIPTION OF THE INVENTION

Figure 1A:
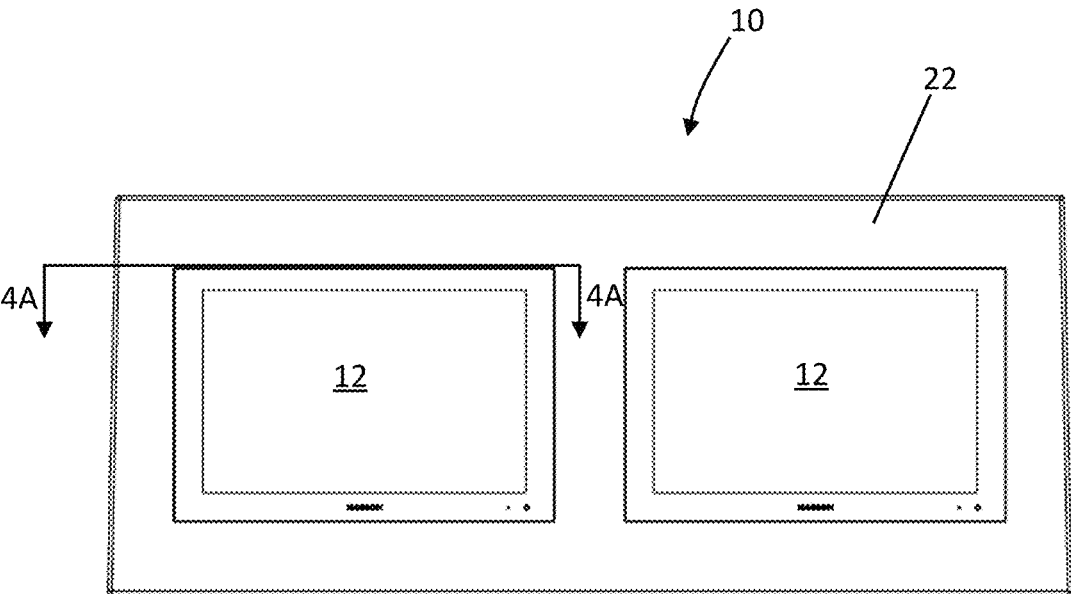
FIG. 1A is a front plan view the flush mount dash assembly as disclosed in accordance with at least one embodiment of the present invention.
Figure 1B:
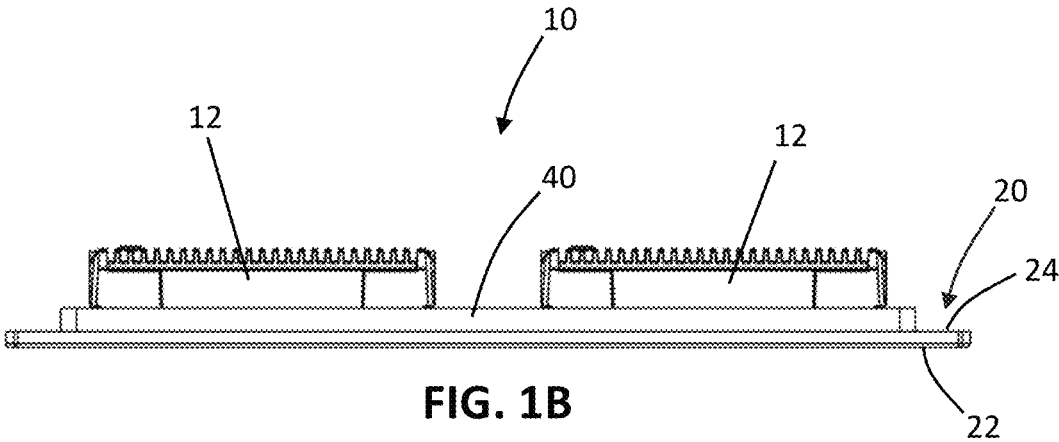
FIG. 1B is a top view of the flush mount dash assembly as disclosed in accordance with at least one embodiment of the present invention.
Figure 1C:
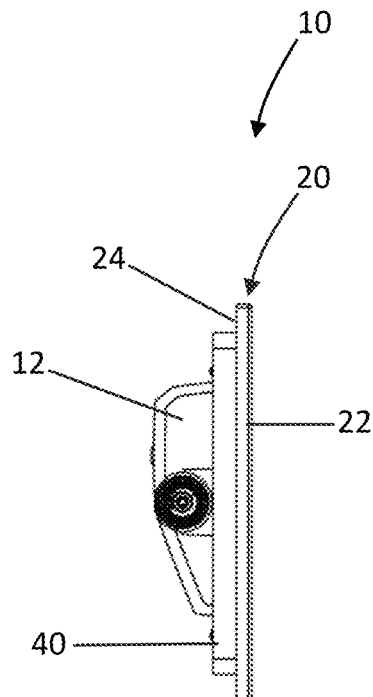
FIG. 1C is a left-side view of the flush mount dash assembly as disclosed in accordance with at least one embodiment of the present invention.
Figure 1D:
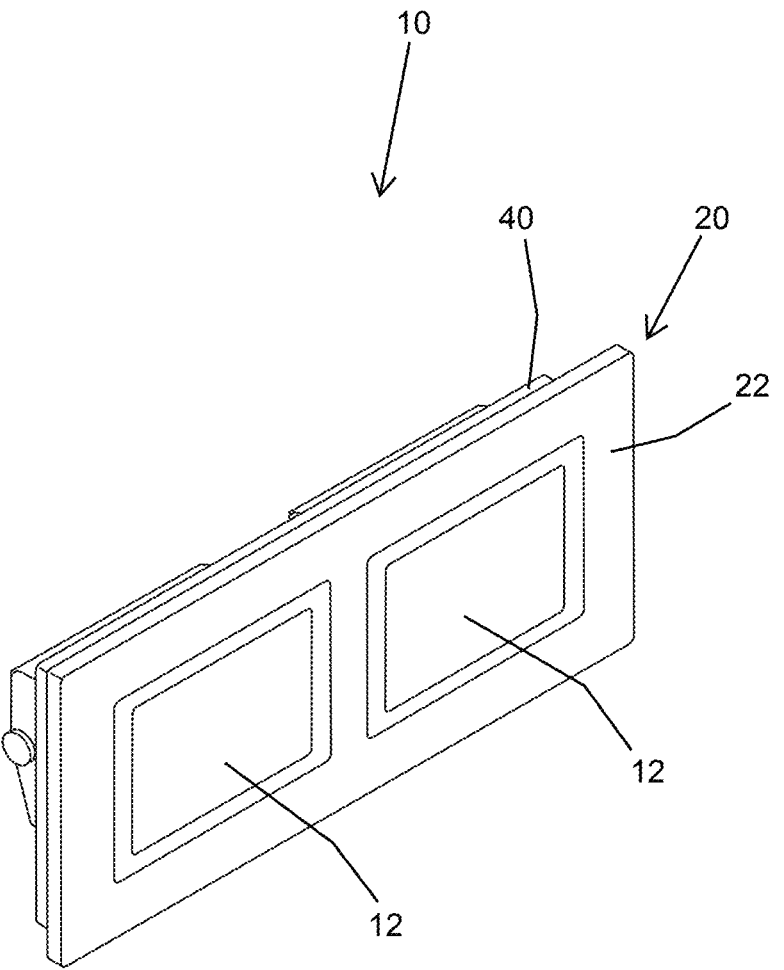
FIG. 1D is a perspective view of the flush mount dash assembly as disclosed in accordance with at least one embodiment of the present invention.

As shown in the accompanying drawings, and with particular reference to FIGS. 1A-1D and FIG. 5, at least one embodiment of the present invention is directed to a flush mount dash system or assembly, generally referenced as 10, and a method of installing the flush mount dash assembly, generally referenced as 100. More specifically, as described herein, the adjustable flush mount dash system or assembly 10 and method 100 is used to allows for one or multiple units 12 (e.g., display unit, GPS unit, gauges, switches, etc.) to be flush mounted to the same dash panel 20, while at the same time allowing for varying thicknesses of materials (e.g., acrylic, starboard, etc.) and units 12. The system 10 and method 100 will result in a solid, flush surface, formed by a front surface of the dash panel 20 and a front surface of the unit(s) 12, with no exposed fasteners, creating a sleek look and theft deterrence.

In particular, the dash panel 20, of at least one embodiment, forms a frame around the unit(s) 12 and is the component to which the unit(s) form a flush surface. In this manner, the dash panel 20 is mounted to the console (not shown) of the watercraft and includes a front or external-facing surface 22, a rear or internal-facing surface 24 and at least one opening 25 extending between the front surface 22 and rear surface 24. In most cases, each opening 25 corresponds to a unit 12 that will be mounted in accordance with the various embodiments of the present invention. Accordingly, as shown in FIGS. 1A-1D, the dash panel 20 includes two rectangularly-shaped openings 25, each sized and shaped to correspond with a unit 12. In this example, two units 12 are being mounted to the same dash panel 20 in a side-by-side manner. However, it is contemplated that other embodiments of the dash panel 20 may include one opening 25, or any number of openings 25 more than one to accommodate one or more units. Furthermore, while the openings 25 shown in the figures are similar in shape and size and are disposed in a side-by-side manner, the configuration of the dash panel 20 and the opening(s) 25 thereof are not limited to such a configuration.

In many cases, the front surface 22 of the dash panel 20 is planar or flat, although in other embodiments, at least part of the front surface 22 may be contoured, curved, angled or otherwise non-planar. Similarly, in many cases, the rear surface 24 of the dash panel 20 is planar or flat, although in other embodiments, at least a part of the rear surface 24 may be contoured, curved, angled or otherwise non-planar.

Moreover, it should also be noted that the dash panel 25 may be made of or include an acrylic material, starboard, polyethylene board or material, or other materials.

Figure 2:
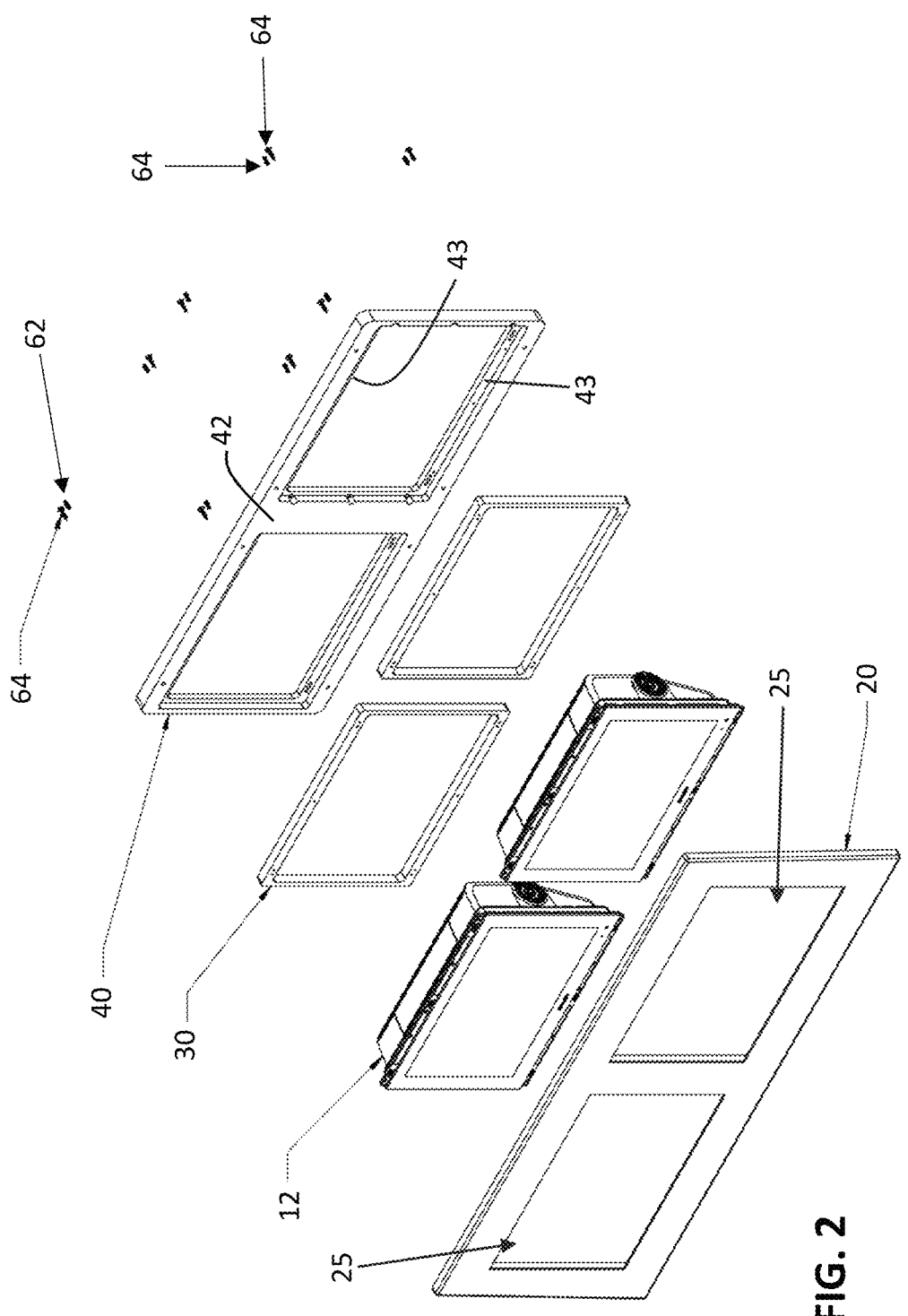
FIG. 2 is an exploded view of the flush mount dash assembly as disclosed in accordance with at least one embodiment of the present invention, illustrating two units installed in a side-by-side manner.
Figure 3A:
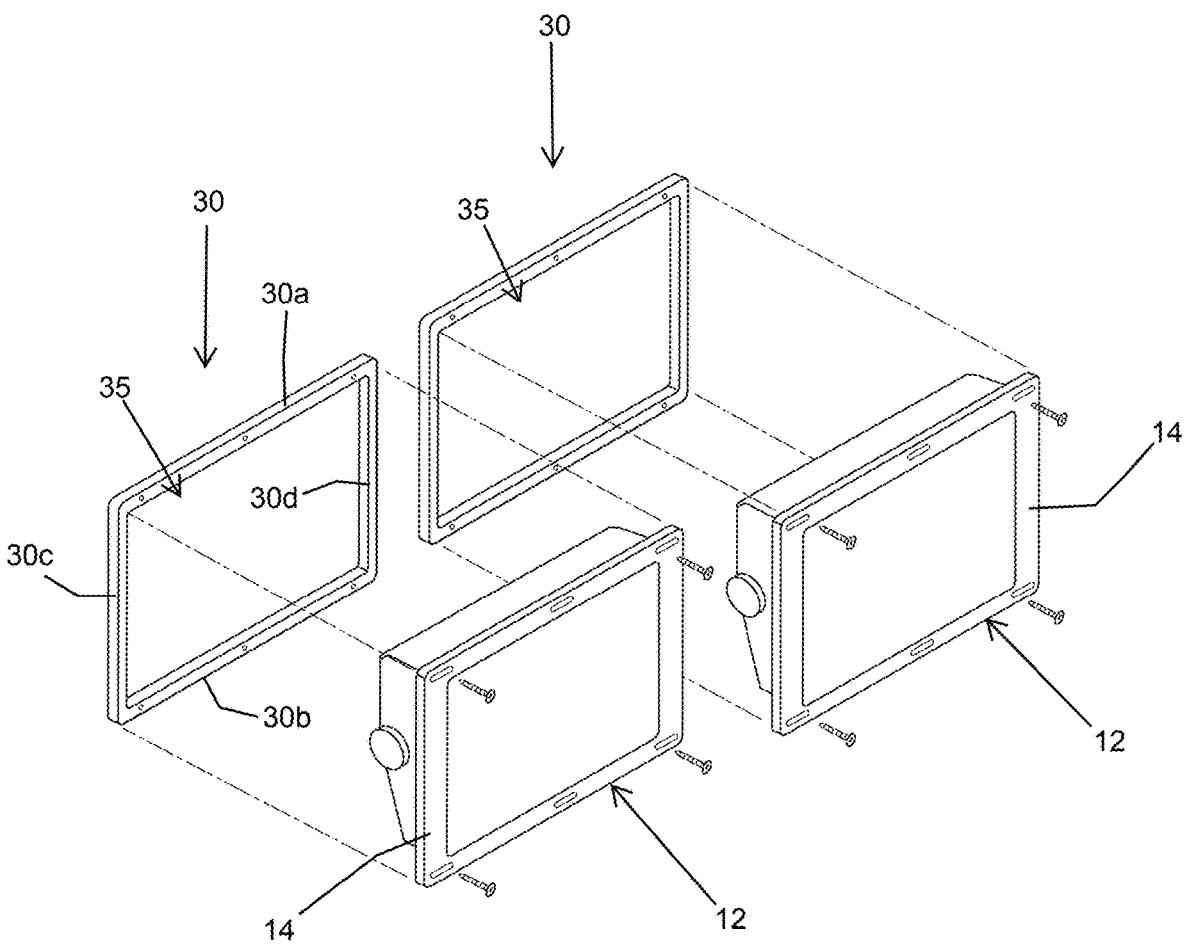
FIG. 3A is an exploded view of two floating spacers being attached to corresponding units via a plurality of fasteners, as disclosed in accordance with at least one embodiment of the present invention.
Figure 3B:
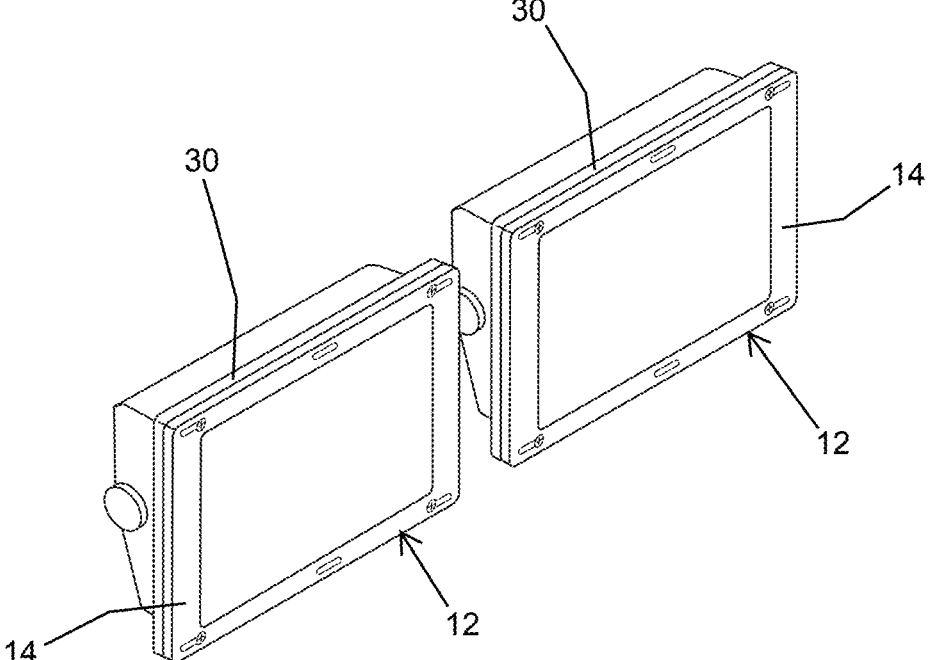
FIG. 3B is a perspective view showing the two floating spacers illustrated in FIG. 3A attached to the corresponding units, as disclosed in accordance with at least one embodiment of the present invention.

With reference to FIGS. 2 and 3A-3B, at least one embodiment of the present invention also includes one or more floating spacers 30. The floating spacer(s) 30, of at least one embodiment includes an outer frame, for example, defined by a top section 30a, bottom section 30b, and two or more side sections 30c, 30d, defining an interior opening or aperture 35 there between.

Turning to the high-level flow chart of FIG. 5, the method 100 of at least one embodiment includes mounting the floating spacer 30 to the unit 12, as represented at 102, and as shown in FIGS. 3A-3B. As just an example, and as represented in FIG. 3A, the unit 12 may include a mounting frame 14 defining a plurality of holes, slots or openings through which one or more fasteners can pass. In this example, the floating spacer 30 is formed in a manner to correspondingly fit to or mount to the frame 14 of the unit 12. Mounting or securing the floating spacer 30 to the unit 12 can be accomplished by using a plurality of screws or other fasteners passed partially through the frame 14 of the unit 12 and into mounting engagement with the spacer 30. The opening 35 of the spacer 30 is shaped and sized to receive a rear portion or back of the unit 12, as generally shown in FIG. 3B.

In this manner, it is contemplated that in other embodiments, the floating spacer 30 may have a different size and shape to accommodate other units that may also have a different size and shape than that shown in the exemplary figures. Accordingly, the floating spacer 30 of the various embodiments of the present invention is not limited to the particular shape, size or dimensions of that shown in the figures and may include more or less than four sides, one or more openings to accommodate the unit, etc., and still fall within the full spirit and scope of the present invention.

Figure 3C:
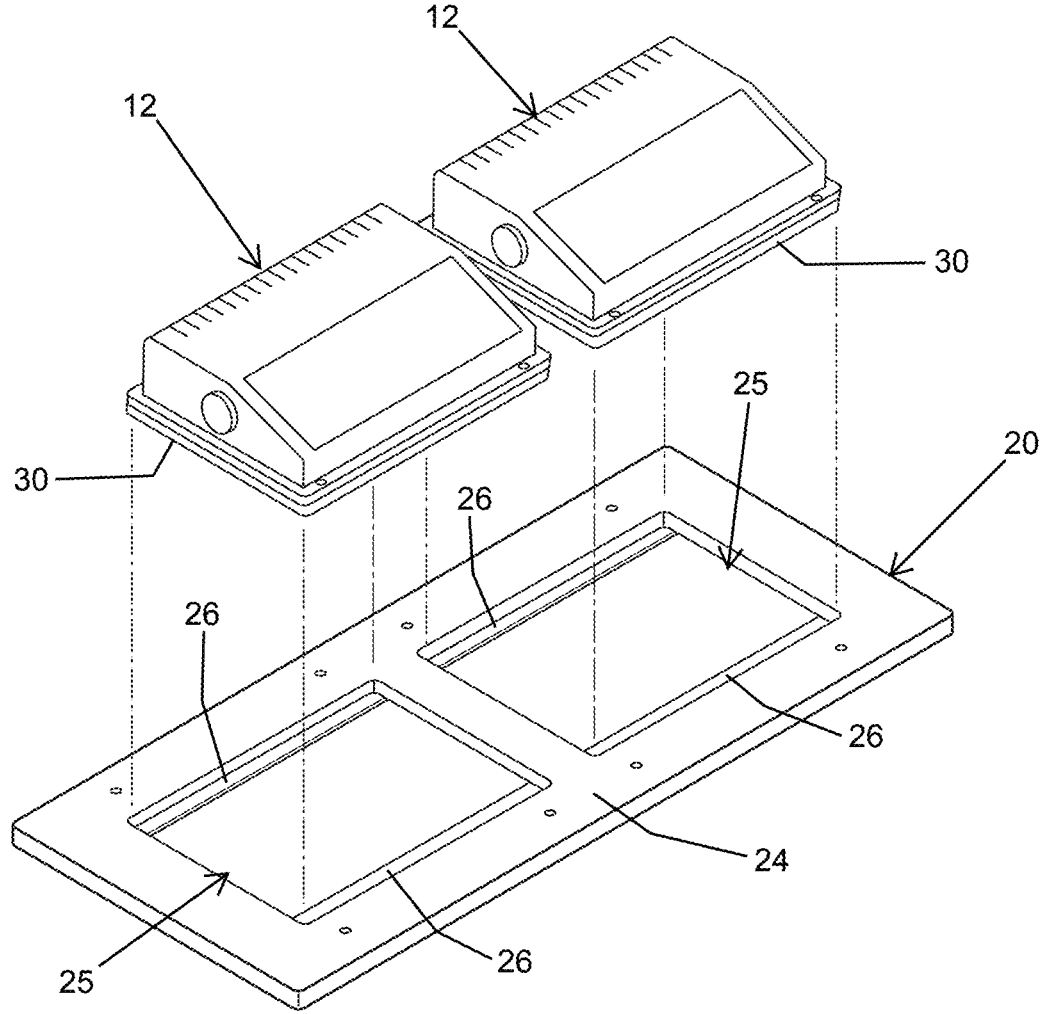
FIG. 3C is an exploded view showing two sets of floating spacers and units being disposed within corresponding recessed framed openings of a dash panel, as disclosed in accordance with at least one embodiment of the present invention.
Figure 3D:
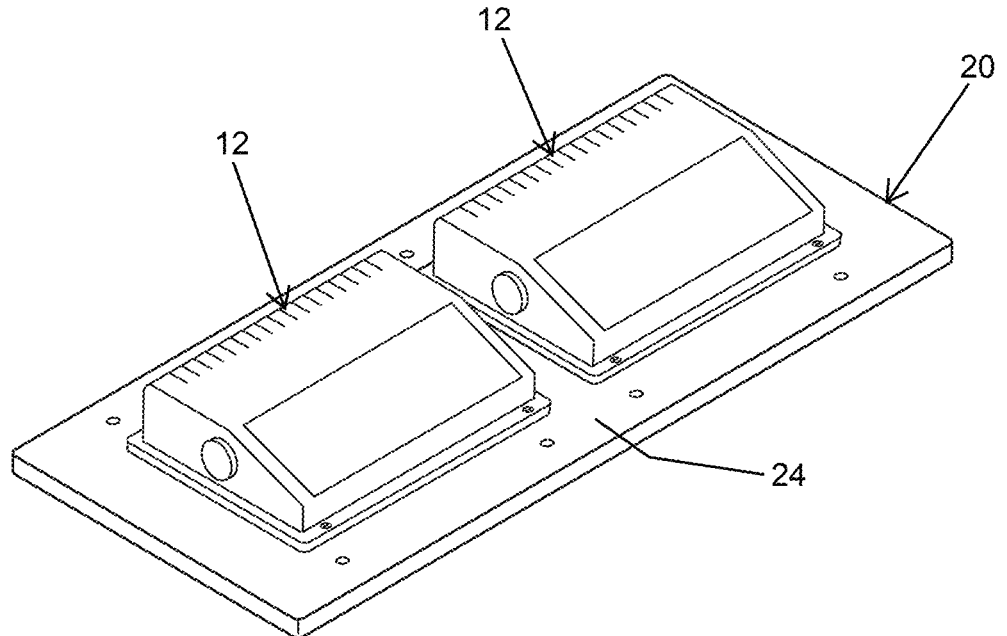
FIG. 3D illustrates the two sets of floating spacers and units disposed within corresponding recessed framed openings of the dash panel, as disclosed in accordance with at least one embodiment of the present invention.

Next, and referring again to the high-level flow chart of FIG. 5, the method 100 of at least one embodiment also includes disposing the floating spacer 30, and the now-attached unit 12, into an opening 25 of the dash panel 20, as represented at 104, and as shown in FIGS. 3C-3D.

More in particular, the floating spacer 30 and unit 12 are disposed into the opening 25 through the rear surface 24, thereof. In some cases, the opening 25 may include an inset framed opening 25 with one or more ledges 26. The ledge(s) 26 are recessed from the rear surface 24 of the dash panel 20 such that the floating spacer 20 and/or unit 12 can sit.

Figure 3E:
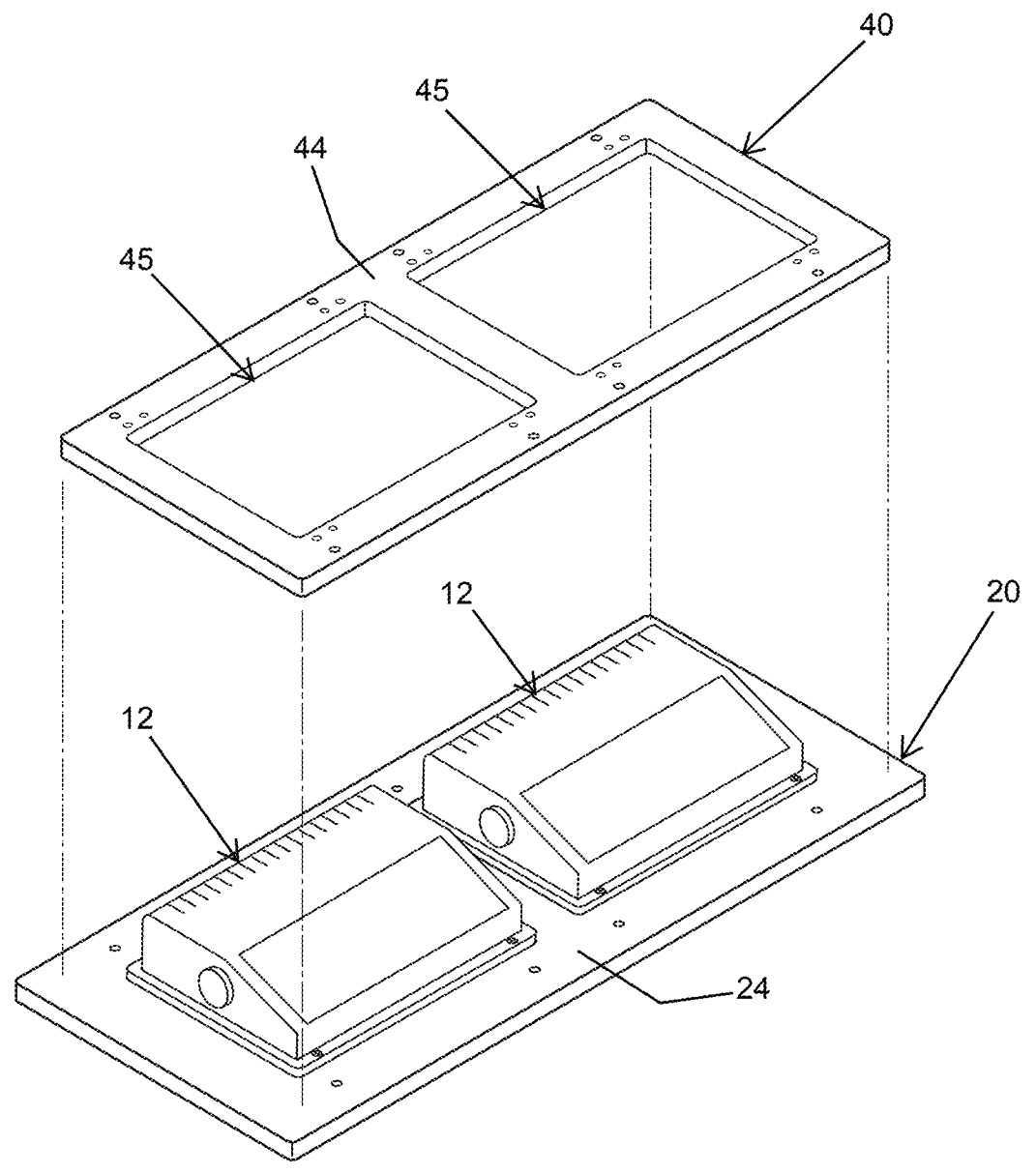
FIG. 3E is an exploded view showing a backing plate being disposed in an overlying relation with the rear surface of the dash panel and at least partially enclosing the floating spacer within a combined opening, as disclosed in accordance with at least one embodiment of the present invention.
Figure 3F:
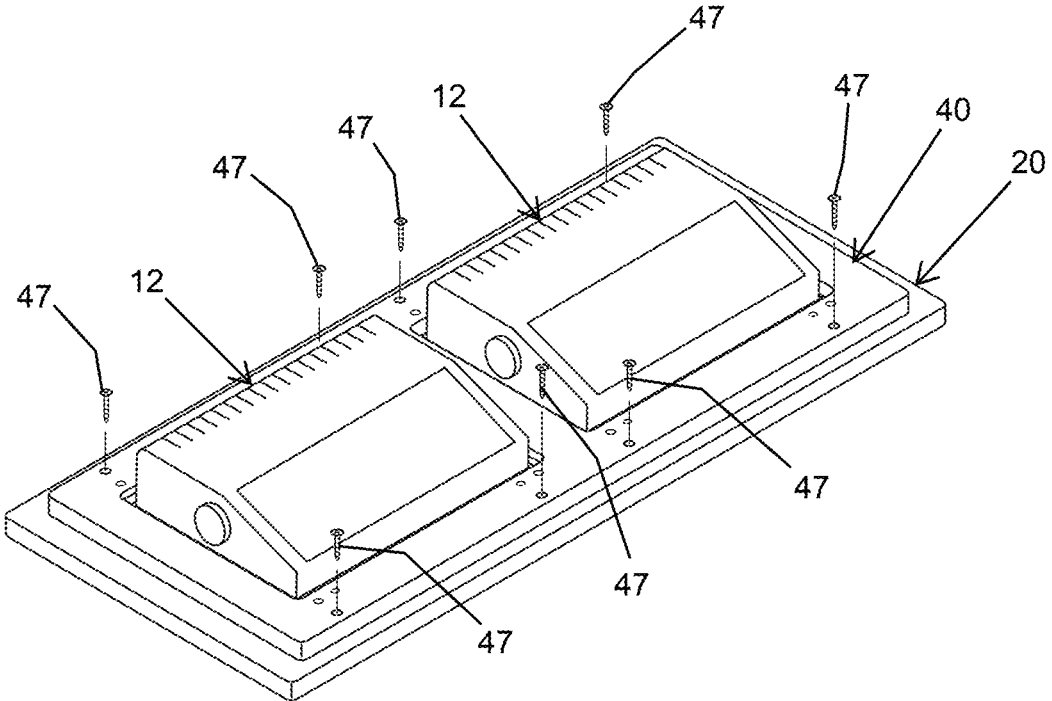
FIG. 3F illustrates the backing plate being fixedly attached to the dash panel, as disclosed in accordance with at least one embodiment of the present invention.

Furthermore, the system 10 of at least one embodiment includes a backing panel or backing plate 40 which includes a front surface 42, a rear surface 44 and at least one opening or recess 45. With the floating spacer 30 disposed in the opening 25 of the dash panel 20, the backing plate 40 is mounted to the rear surface 24 of the dash panel 20 such that the opening or recess 45 of the backing plate 40 is at least partially aligned with a corresponding opening 25 of the dash panel 20, as represented at 106 in FIG. 5 and as shown in FIGS. 3E-3F. In this manner, the opening 25 of the dash panel 20 and the corresponding opening or recess 45 of the backing plate 40 collectively defining a combined opening within which the floating spacer 30 is disposed.

More in particular, in at least one embodiment, a portion of the backing plate 40 overlies at least a portion of the floating spacer 30, enclosing the floating spacer 30 within the combined opening formed by the backing plate 40 and dash panel 20. In some embodiments, the at least one opening 45 of the backing plate 40 may also include one or more recessed peripheral ledges 43 recessed from the front surface 42. In some cases, the recessed peripheral ledge(s) 43 at least partially overlie the floating spacer 30, enclosing the floating spacer 30 within the combined opening.

As shown in FIG. 3F, for example, the backing plate 40 can be fixedly mounted in place, for example, to the dash panel 20 via a plurality of fasteners disposed through the backing plate 40 and into the dash panel 20. Other ways of fixing the backing plate 40 in place are contemplated.

In any case, with the backing plate 40 fixed in place, the floating spacer 30, and attached unit 12, is able to move axially within the combined opening toward and away from the front surface 22 of the dash panel 20. More specifically, with reference to the cut-away view of FIG. 4B, the depth D of the combined opening 55 within which the floating spacer 30 is disposed is larger than the thickness T of the floating space 30 and frame 14 of the unit 12. This allows the floating spacer 30, and attached unit 12, to move toward and away from the front surface 22 of the dash panel 20 within the combined opening 55.

Figure 3G:
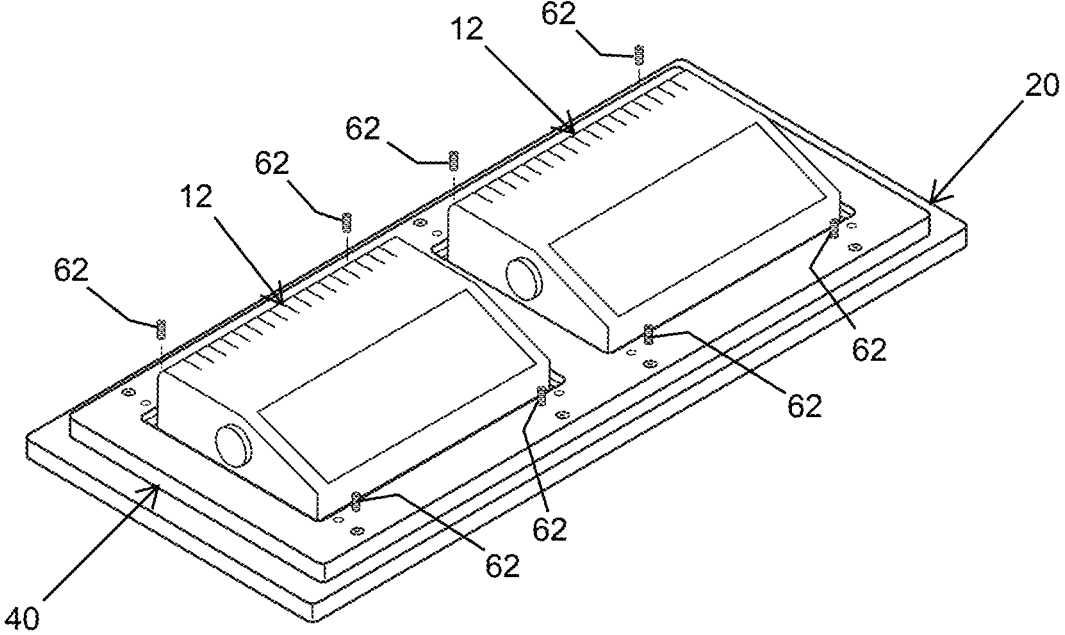
FIG. 3G illustrates a plurality of set screws being used to selectively position the floating spacer (not shown in this Figure), as disclosed in at least one embodiment of the present invention.

Next, referring again to the high-level flow chart of FIG. 5, the method 100 of at least one embodiment also includes selectively adjusting a plurality of adjustment devices 62 to adjust the axial position of the floating spacer 30 and attached unit 12 to a desired axial position within the combined opening 55, as shown at 108 and in FIG. 3G. More specifically, the desired axial position is often defined when the front surface of the unit 12 is flush or even with the front surface 22 of the dash panel 20, although other desired axial positions are contemplated.

Furthermore, the adjustment devices 62 as used herein may include set screws or adjustment screws that pass through the backing plate 40 and into engagement with the floating spacer 30. In some cases, the set screws or adjustment screws 62 may pass through the ledge(s) 43 of the backing plate 40, although other locations are contemplated so long as the set screws or other adjustment devices 62 engage the floating spacer 30 to push or position the floating spacer 30 into the desired position within the combined opening 55. Of course, other adjustment devices are contemplated within the full spirit and scope of the present invention.

Figure 3H:
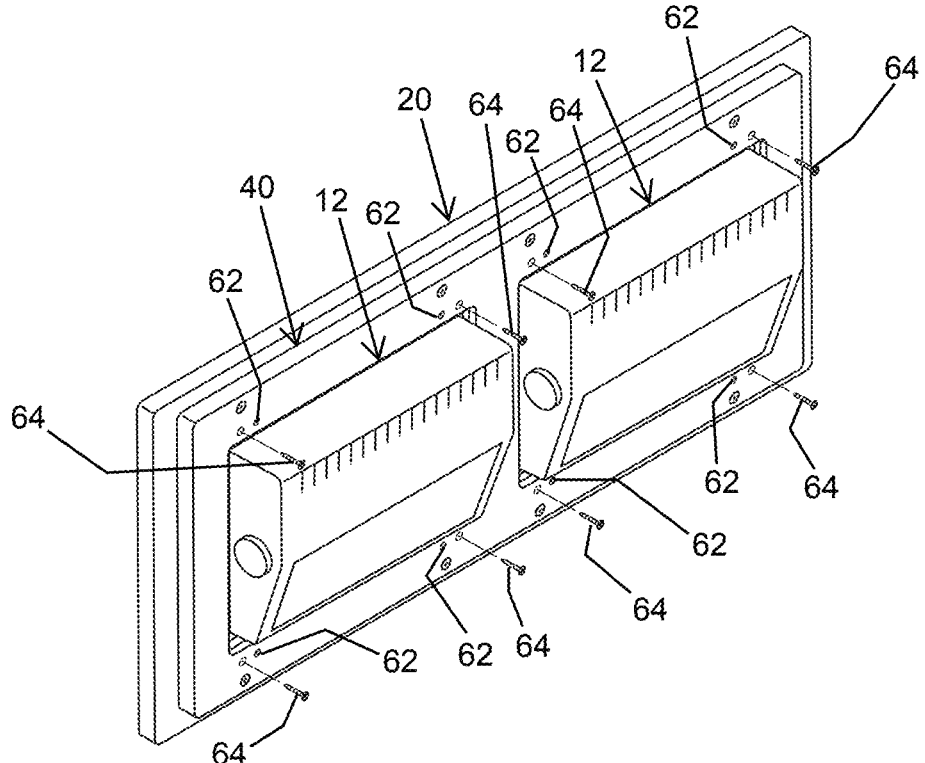
FIG. 3H illustrates a plurality of mounting screws being disposed through the backing plate and into the floating spacer (not shown in this Figures, as disclosed in accordance with at least one embodiment of the present invention.

Once the floating spacer 30, and unit 12 are in the desired position, the floating spacer is fixedly mounted or secured in the desired position via one or a plurality of stoppers or fasteners 64, as shown at 110 in FIG. 5 and in FIG. 3H. More specifically, in at least one embodiment, a plurality of screws 64 are passed through the backing plate 40 and into fixed engagement with the floating spacer 30 to fix the floating spacer 30 in the desired or selected position. Once the fasteners 64 are engaged with the floating spacer 30, the floating spacer 30 no longer moves within the combined opening 55, and is therefore, no longer floating. This secures the unit 12 in place, often forming a flush or even surface with the front of the dash panel 20.

The assembly 10 can then be mounted to the console of the boat, watercraft, vessel or other vehicle.

Figure 4A:
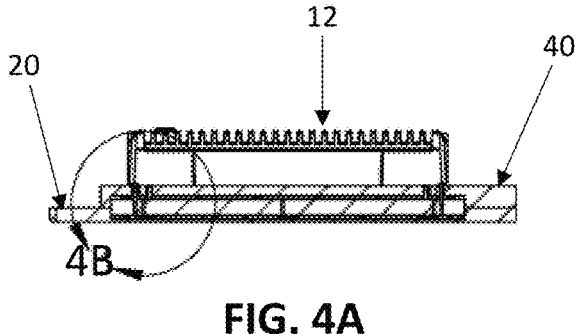
FIG. 4A is a cut-away view of the assembly along line 4A-4A shown in FIG. 1A.
Figure 4B:
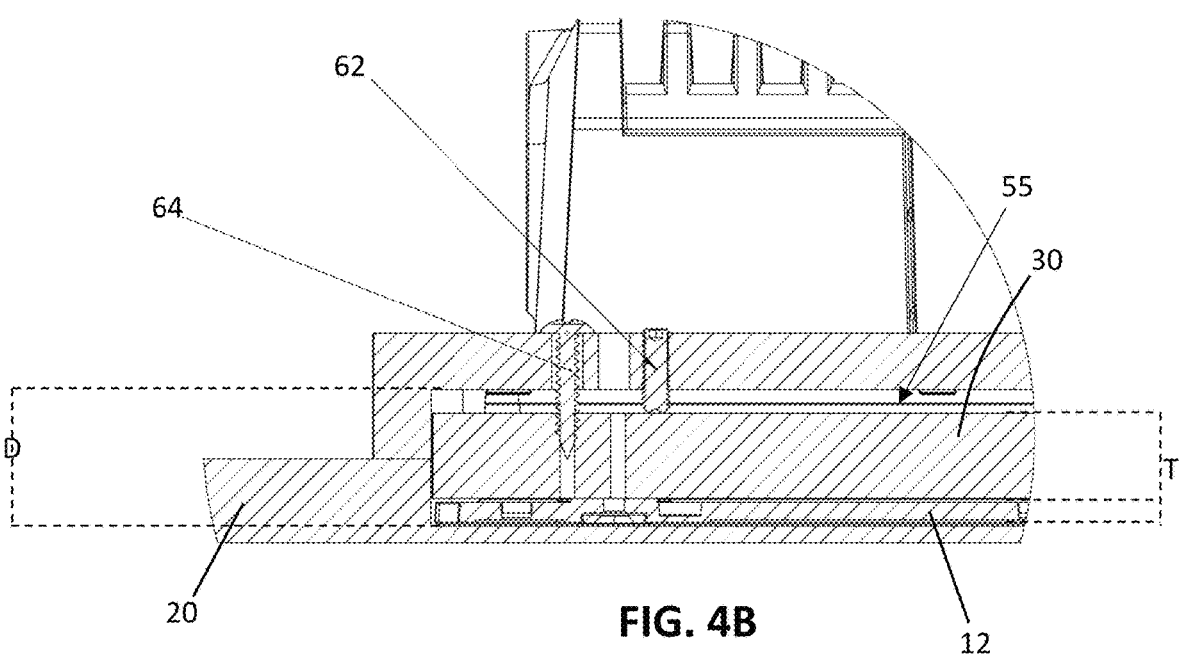
FIG. 4B is a close-up view of section 4B shown in FIG. 4A.
Figure 6A:
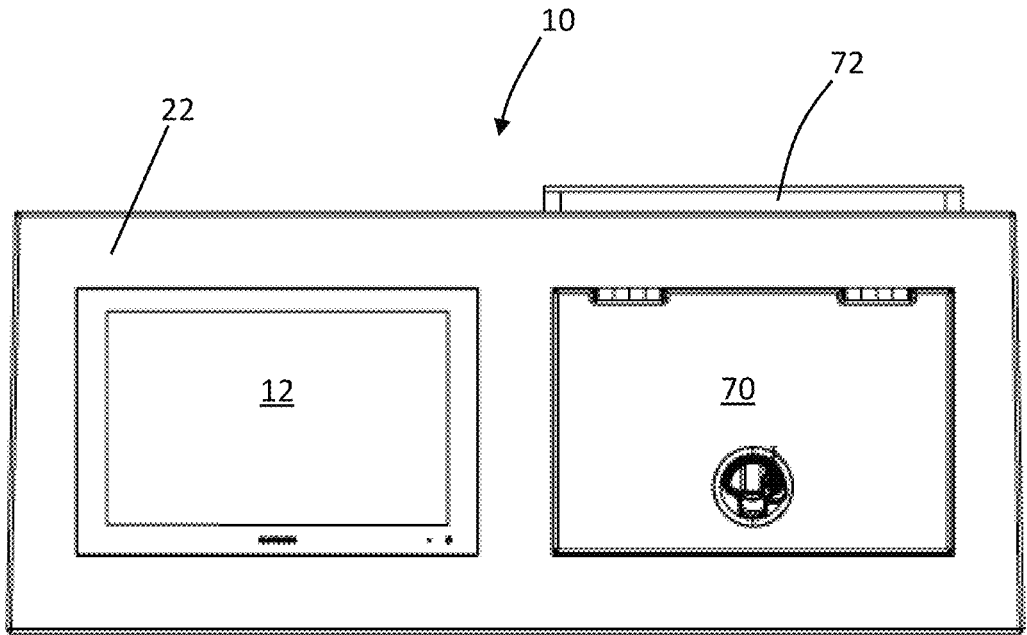
FIG. 6A is a front plan view of another embodiment of the assembly as disclosed herein.
Figure 6B:
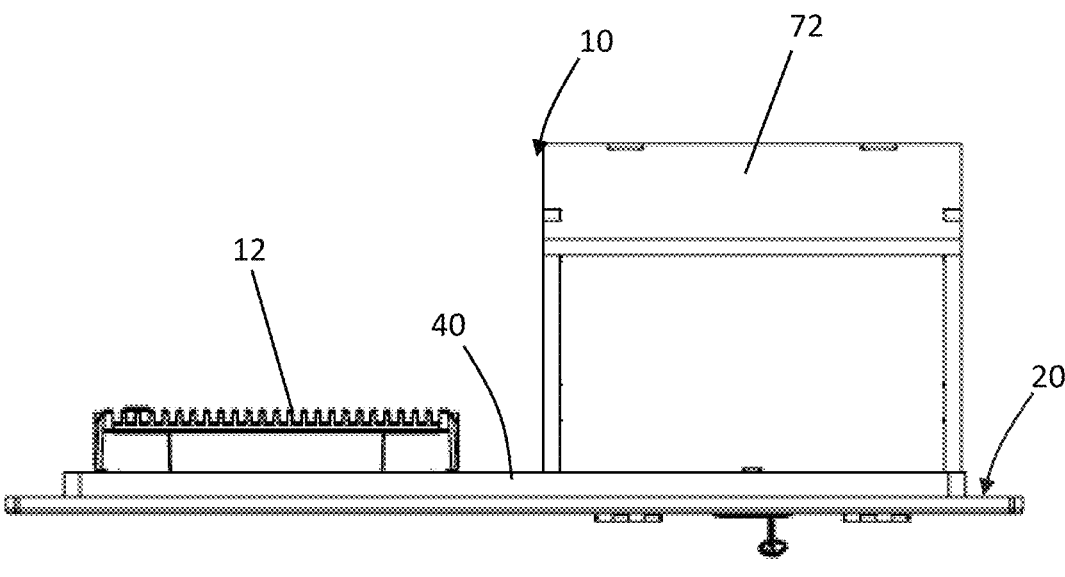
FIG. 6B is a top view of the assembly illustrated in FIG. 6A.
Figure 6C:
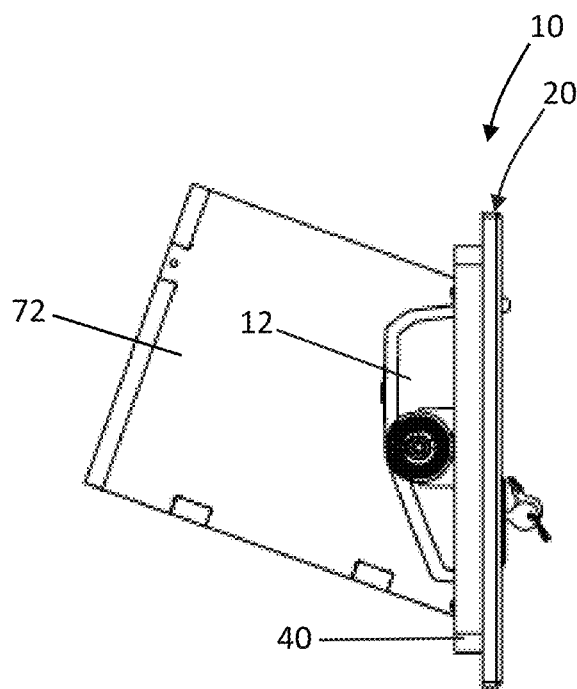
FIG. 6C is a left-side view of the assembly illustrated in FIG. 6A.

FIG. 4A represents a cross-sectional view of the assembly 10 along line 4A-4A shown in FIG. 1A, and FIG. 4B represents a close-up view of section 4B shown in FIG. 4A. More specifically, FIG. 4B illustrates set screws 62 passing through backing plate 40 and into engagement with the floating spacer 30 to selectively position the floating spacer 30 with the opening 55. Mounting screws or fasteners 64 are then driven through the backing plate 40 and into engagement with the floating spacer 30 to secure the floating spacer 30 and unit 12 in place.

FIGS. 6A-6C, 7 and 8 represent another embodiment of the system or assembly 10 and method 200 wherein a unit 12 is installed in one opening 25 of the dash panel 20 and a storage compartment 72 and door 70 are installed within another opening 25b of the dash panel 20. More specifically, the storage unit 72 may be referred to as a glove compartment, glove box or other storage unit or compartment.

Figure 8:
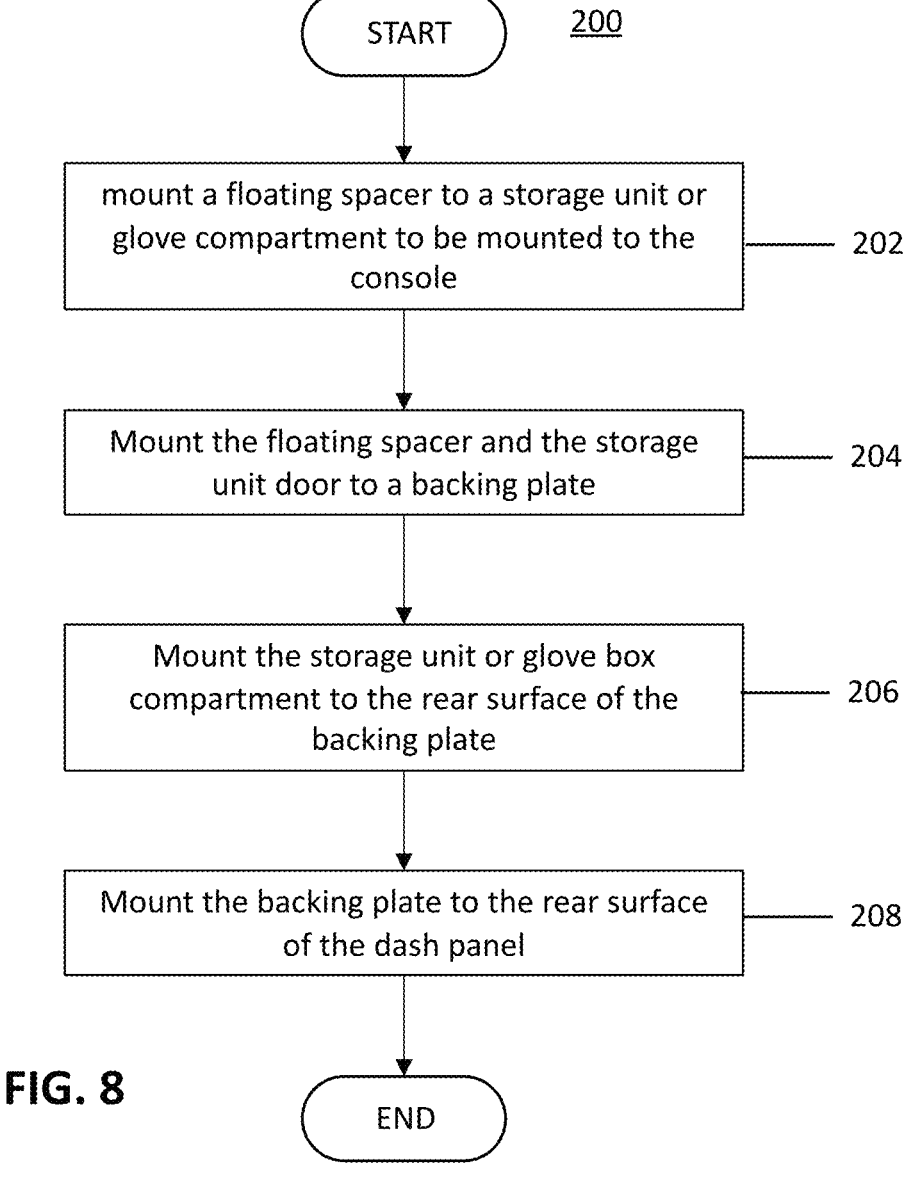
FIG. 8 is a high-level flow chart of the method as disclosed in accordance with at least one embodiment of the present invention.

More specifically, the method 200 is similar to the method 100 and includes mounting a storage unit spacer 80 to the storage unit door 70, as shown at 202 in FIG. 8. In some embodiments, the storage unit door 70 is mounted to the spacer 80 via one or more hinges, although other manners of mounting the door 70 to the spacer 80 are contemplated.

Figure 7:
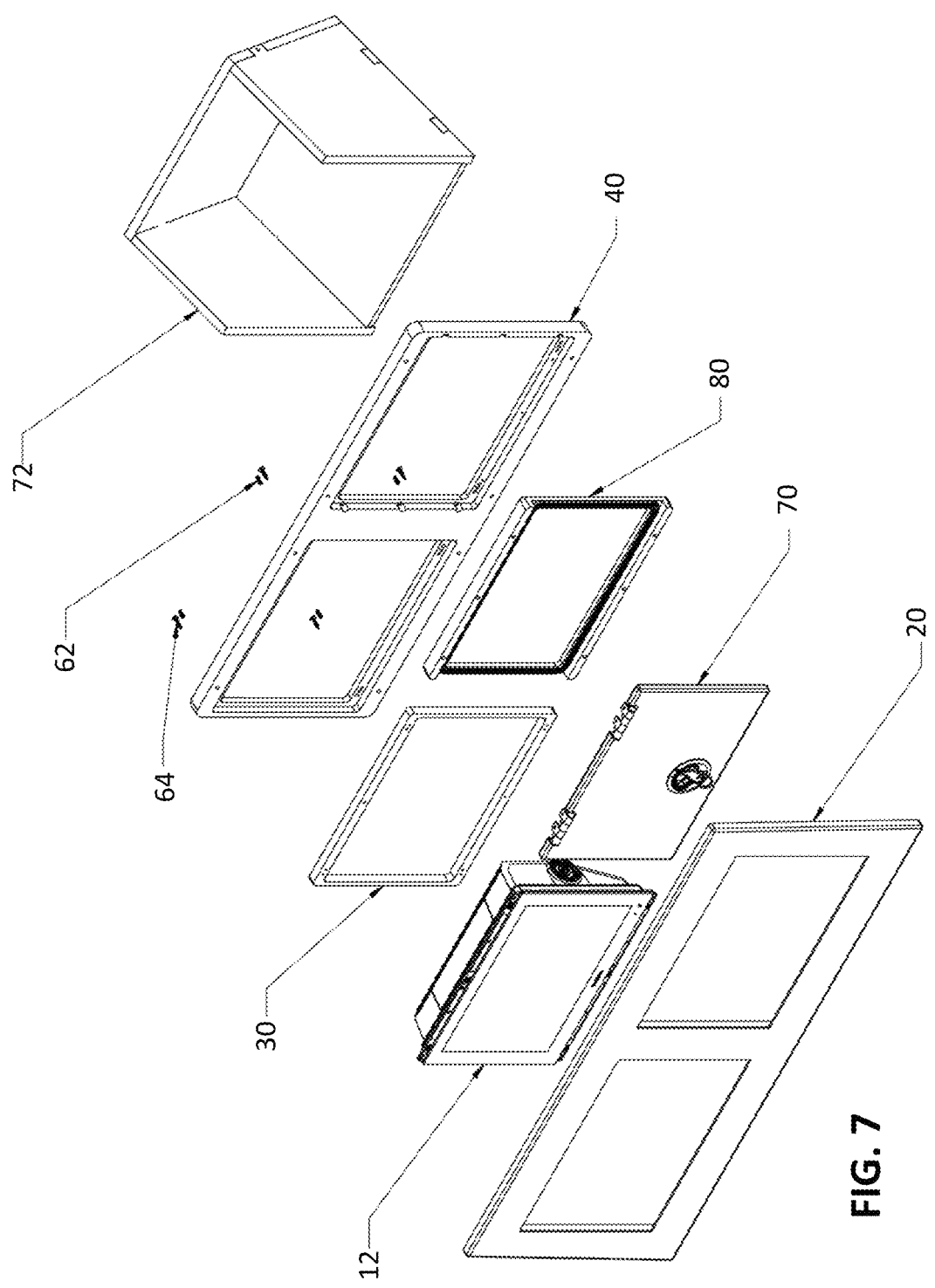
FIG. 7 is an exploded view of the assembly illustrated in FIGS. 6A-6C.

As shown in FIG. 7, the spacer 80 may include a recessed section defined by top and bottom bars within which the storage unit door 70 is disposed. Other configurations of the spacer 80 and door are contemplated.

Next, the spacer 80 and door 70 are mounted to the backing plate 40, as shown at 204 in FIG. 8. This can be accomplished through the use of a plurality of screws or other fasteners (not shown). The storage unit or box 72 is then mounted to the rear surface of the backing plate 40, as shown at 206 in FIG. 8, again through the use of one or more screws or other fasteners.

Next, as shown at 208 in FIG. 8, the backing plate 40 is mounted to the dash panel 20 in the same manner as described above with the other embodiments.

It should be noted that, in this embodiment as shown in FIGS. 7 and 8, the unit 12 may be installed in a similar manner as disclosed above with reference to FIGS. 1A-5.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

The invention claimed is:

1. A flush mount dash system for mounting at least one display unit to a dash, said system comprising:
   a dash panel comprising:
      a front surface,
      a rear surface, and
      at least one opening extending between said front surface and said rear surface,
   at least one floating spacer mounted to the at least one display unit, said at least one floating spacer comprising an outer frame defining an opening through which a rear portion of the at least one display is disposed,
   at least one backing plate comprising:
      a front surface,
      a rear surface, and
      at least one opening extending between said front surface and said rear surface,
   wherein said at least one backing plate is fixedly mounted to said rear surface of said dash panel such that said at least one opening of said at least one backing plate is at least partially aligned with said at least one opening of said dash panel, forming a combined opening,
   wherein, said at least one floating spacer, mounted to the at least one display unit, is, at least temporarily, movably disposed within said combined opening formed by said at least one backing plate and said dash panel,
   a plurality of adjustment devices engagable with said at least one floating spacer to selectively adjust an axial position of said floating spacer within said combined opening, and
   a plurality of stoppers configured to fixedly mount said at least one floating spacer in a selectively adjustable axial position within said combined opening while a front surface of the display unit is flush with said front surface of said dash panel.

2. The system as recited in claim 1 wherein said at least one opening of said dash panel comprises at least one ledge recessed from said rear surface of said dash panel.

3. The system as recited in claim 2 wherein said at least one opening of said at least one backing plate comprises at least one ledge recessed from said front surface of said at least one backing plate.

4. The system as recited in claim 3 wherein said at least one floating spacer correspondingly fits within said combined opening between said at least one ledge of said at least one opening of said dash panel and said at least one ledge of said at least one opening of said at least one backing plate.

5. The system as recited in claim 4 wherein said plurality of adjustment devices comprise a plurality of set screws disposed through said at least one ledge of said at least one backing plate and into engagement with a rear surface of said floating spacer.

6. The system as recited in claim 5 wherein said plurality of stoppers comprises a plurality of fastening devices disposed through said at least one ledge of said at least one backing plate and into fixed engagement with said floating spacer.

7. A method for installing a flush mount dash system with at least one display unit to a dash, the method comprising:
   mounting a floating spacer to the at least one display unit, the floating spacer comprising an outer frame defining an opening through which a rear portion of the at least one display unit is disposed,
   disposing the floating spacer and the at least one display unit into an inset framed opening on a rear surface of a dash panel,
   fixedly mounting a backing plate to the rear surface of the dash panel, the backing plate comprising an opening that is at least partially aligned with the inset framed opening of said dash panel, said opening of said backing plate and said inset framed opening of said dash panel collectively define a combined opening, wherein the floating spacer and the at least one display unit are at least temporarily movably disposed within the combined opening,
   selectively adjusting a plurality of adjustment device to adjust an axial position of the floating spacer and the at least one display unit within the combined opening, and
   when the floating spacer and the at least one display unit are in a desired axial position, fixedly mounting the floating spacer in the desired axial position with a plurality of stoppers.

8. The method as recited in claim 7 further comprising defining the inset frame opening of the dash panel as comprising at least one ledge recessed from the rear surface of the dash panel.

9. The method as recited in claim 8 further comprising defining the opening of the backing plate as comprising at least one ledge recessed from the front surface of the backing plate.

10. The method as recited in claim 9 further comprising defining the floating spacer as fitting within the combined opening between the at least one ledge recessed from the rear surface of the dash panel and the at least one ledge recessed form the front surface of the backing plate.

11. The method as recited in claim 10 further comprising defining the plurality of adjustment devices as comprising a plurality of set screws disposed through the at least one ledge of the backing plate and into engagement with a rear surfacer of the floating spacer.

12. The method as recited in claim 11 further comprising defining the plurality of stoppers as comprising a plurality of fastening devices disposed through the at least one ledge of the backing plate and into a fixed engagement with the floating spacer.

\* \* \* \* \*